Figure 1:
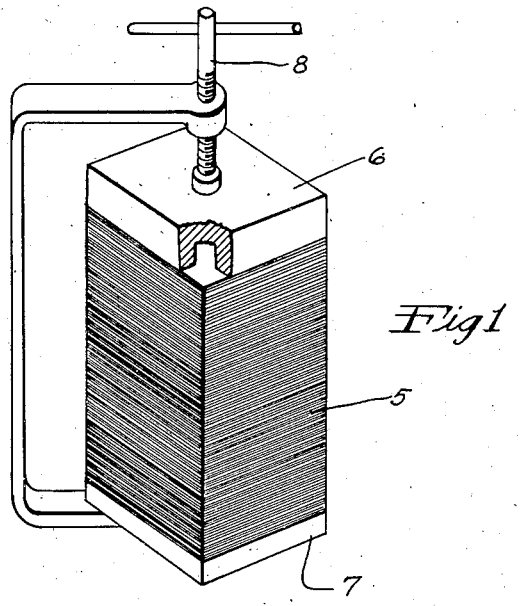

Oct. 14, 1941.  G. M. BROWN ET AL  2,259,239

MANUFACTURE OF BAGS

Filed Sept. 5, 1940

Inventor
George M. Brown
and James E. Snyder

By

Attorney

Patented Oct. 14, 1941

2,259,239

UNITED STATES PATENT OFFICE 2,259,239

MANUFACTURE OF BAGS

George M. Brown, New York, N. Y., and James E. Snyder, Akron, Ohio, assignors to Wingfoot Corporation, Wilmington, Del., a corporation of Delaware Application September 5, 1940, Serial No. 355,418

2 Claims. (Cl. 93—35)

This invention relates to an improved method of manufacturing bags from film of heat-sealable material in which there are stresses which on heating cause the film to become distorted. The film may be composed of rubber hydrochloride, a cellulose ester or ether, a polymerized vinyl derivative, etc., plasticized as necessary or desired. The invention will be discussed more particularly in connection with the use of rubber hydrochloride film, although any heat-sealable thermally stretched film containing stresses may be used. The stresses will usually be produced by heating the film, stretching it and then allowing it to cool while maintaining it under the stretching tension.

It has been customary to use heat in uniting two sheets of rubber hydrochloride film in the manufacture of liquid and gas-tight bags etc. Due to the tendency of the film used in this invention to curl or otherwise become distorted on heating, it has been practically impossible to use heat to make unions with such film.

The rubber hydrochloride film which has found greatest use in industry is about .001 of an inch thick. Thinner film is made by heating such film and passing it over two rollers, one of which has a surface speed several times that of the other. The heated film is thus stretched in passing from one roller to the other. It may be stretched to only double its original length or it may be stretched to five or six or more times its original length. Instead of stretching lengthwise, the film may be stretched widthwise. The same ply of film may be stretched first in one direction and then in the other.

As the stretching increases the tensile strength of the film, it has been advantageous to ply up two sheets of film with the axes of stretch in one ply at right angles to that in the other ply. These two plies may be united by heat and pressure or by adhesive, etc. Instead of two plies, three or more plies may be laminated and the axes of stretch may run in different directions in the different plies or they may run in the same direction in all of the plies.

The stretching of rubber hydrochloride film sets up stresses in the stretched product which are relieved when the film is reheated. This causes the film to shrink and become distorted. The type of distortion depends upon the film under consideration, that is whether it is a single ply or a multi-ply film and the nature of stretch in the different plies and how it has been heated.

According to this invention bags are made from two sheets of any rubber hydrochloride film or other heat-sealable, thermally stretchable film which contains stresses which are relieved on heating. Many bags are made in a single operation. A stack is made by piling up alternately two sheets of the film and then a sheet of insulating material, i. e., a material which does not become united to the film when heat is applied to the edge of the stack. Thin tissue paper has been found satisfactory for this purpose. The stack is made with the edges of the sheets of film and insulating material in perfect alignment. This is preferably obtained by cutting through the entire stack with a guillotine cutter. The sheets from which the bags are made may be square, oblong, circular or any desired shape. If four-sided sheets are used, after the sheets have been stacked up they are held under substantial pressure, especially along the edges to be sealed, in a clamp and then a hot plate is applied to three sides of the stack. The three sides may be heated simultaneously or in rotation. The temperature is considerably higher than that used in sealing non-stretched film and is applied for a sufficient length of time to cause the edges of each two layers of film to become united. Higher pressure is used than that employed for uniting plies of unstretched film. The insulating material prevents any film from becoming united with any other film, except that adjacent to it. The bags are kept within the clamp after heating and until they have cooled and "set" so that substantially no distortion takes place when the pressure of the clamp is relieved. The clamp is then released and the bags formed lie substantially perfectly flat. If the pressure of the clamp is released before the film cools substantially to room temperature, it will be found that the bags do not lie flat but are distorted due to the stresses present in the film. This differs from the method of sealing non-stretched film in that no pressure or tension need be maintained on non-stretched film after heating and while cooling.

Figure 2:
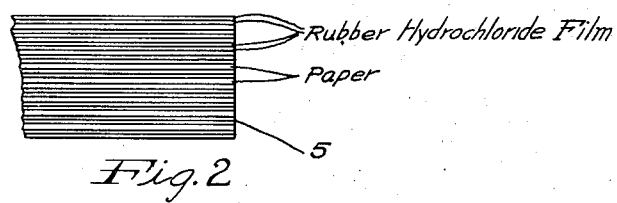
Figure 3:
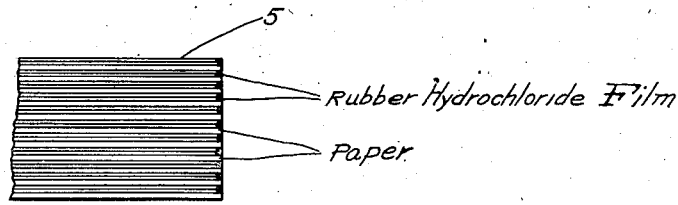

The invention will be further described in connection with the accompanying drawing in which Fig. 1 shows a stack of sheets held in a clamp; Fig. 2 is a detail of the sheets before heating and Fig. 3 is a detail of the sheets after heating as seen from a side which has not been subjected to heat.

In the drawing, Fig. 1 shows a stack of sheets 5 held tightly between two clamping plates 6 and 7. The plate 6 is preferably constructed (as shown) so as to exert maximum pressure along the edges of the sheets. By turning the screw 8, the sheets 5 are held tightly between these clamping plates, so that the sheets are held flat even when heated. The stack is composed of two sheets of rubber hydrochloride film alternating with one sheet of paper as shown in Fig. 2. To make bags from these separate sheets, a hot plate is pressed against three sides of the stack. This hot plate may, for example, be heated to a temperature of about 500° F. If pressed tightly against a side of the stack for about two minutes, it will be found that the adjoining sheets of film are united but that the insulating sheets of paper prevent any sheet of rubber hydrochloride film from becoming united with any other sheet, except that adjacent to it. Under the above conditions a cooling and "setting" period of about five minutes is required before releasing the clamps, to assure non-wrinkled heat-sealing seams. Fig. 3 shows a view of the stack after a hot plate has been pressed against the right hand side of the stack shown but not against the front form which the stack is viewed. It is seen that as the plate was pressed against the side it softened the rubber hydrochloride sheets, and each of the pairs of sheets was united by the films having been heated to the point at which they became tacky, the pressure on the stack being sufficient to cause the tacky portions of adjacent sheets to coalesce. By applying heat to three sides of the stack in this way, three sides of the sheets are united to form bags of the envelope type with an open top.

After uniting the edges of the film, the sheets are maintained in the clamps under pressure until after the film has again cooled to room temperature or a temperature above room temperature at which there is substantially no tendency for the films to curl. Then the pressure is released by unscrewing the clamp and the stack is removed from between the pressure plates 6 and 7. On removing the insulating sheets it will be found that each of the two plies of film has been united on three sides and forms a bag, and furthermore, that this bag has substantially no tendency to curl or become distorted.

We claim:

1. The method of making bags which comprises forming a stack by alternating two films of heat-sealable, thermally stretchable material which contains stresses which are relieved on heating, with a sheet of insulating material, with the sheets of film and insulating material so arranged that their edges are in perfect alignment, holding the sheets and film in a press which applies pressure at the edges to be sealed, applying heat to at least one of the sides of the stack to cause the edges of adjacent films of heat-sealable, thermally stretchable material to become united, and after removing the source of heat, allowing the stack to cool to a temperature at which the sheets of film maintain substantially no tendency to become distorted when the pressure is relieved, and then relieving the pressure from the stack.

2. The method of making bags which comprises forming a stack by alternating two films of rubber hydrochloride which contains stresses which are relieved on heating, with a sheet of insulating material, with the sheets of film and insulating material so arranged that their edges are in perfect alignment, holding the sheets and film in a press which applies pressure at the edges to be sealed, applying heat to at least one of the sides of the stack to cause the edges of adjacent films of rubber hydrochloride to become united, and after removing the source of heat, allowing the stack to cool to a temperature at which the sheets of film maintain substantially no tendency to become distorted when the pressure is relieved, and then relieving the pressure from the stack.

GEORGE M. BROWN.
JAMES E. SNYDER.